US010690254B2

(12) United States Patent
Schiller et al.

(10) Patent No.: US 10,690,254 B2
(45) Date of Patent: *Jun. 23, 2020

(54) TWO EDUCTOR / FOUR-WAY SELECTOR VALVE ASSEMBLY

(71) Applicant: Diversey, Inc., Sturtevant, WI (US)

(72) Inventors: Steven E. Schiller, Kenosha, WI (US); James H. Lohr, Union Grove, WI (US); Paul J. Larson, Racine, WI (US)

(73) Assignee: Diversey, Inc., Fort Mill, SC (US)

( * ) Notice: Subject to any disclaimer, the term of this patent is extended or adjusted under 35 U.S.C. 154(b) by 116 days.

This patent is subject to a terminal disclaimer.

(21) Appl. No.: 15/677,534

(22) Filed: Aug. 15, 2017

(65) Prior Publication Data

US 2018/0094734 A1 Apr. 5, 2018

Related U.S. Application Data

(63) Continuation of application No. 14/166,544, filed on Jan. 28, 2014, now Pat. No. 9,732,862, which is a (Continued)

(51) Int. Cl.
*F16K 11/076* (2006.01)
*F16K 11/02* (2006.01)
(Continued)

(52) U.S. Cl.
CPC ............. *F16K 11/02* (2013.01); *B01F 5/043* (2013.01); *F16K 11/076* (2013.01);
(Continued)

(58) Field of Classification Search
None
See application file for complete search history.

(56) References Cited

U.S. PATENT DOCUMENTS

D118,448 S    1/1940  Helms
2,881,802 A   4/1959  Crawford
(Continued)

FOREIGN PATENT DOCUMENTS

AU    2006280234    2/2008
BR    PI0614689-9   4/2011
(Continued)

OTHER PUBLICATIONS

Examination Report from the Patent Office of the Government of India for Ref. No. POD/Application No/1019/KOLNP/2008 dated Jul. 14, 2016 (8 pages).
(Continued)

*Primary Examiner* — John Fox
(74) *Attorney, Agent, or Firm* — Michael Best & Friedrich LLP

(57) ABSTRACT

A selector valve assembly for use in conjunction with an eductor dispensing system which reduces the incidence of product carry-over when the valve is moved from one position to another. The selector valve assembly also reduces the incidence of improper dispensing. In a preferred manner, the selector valve assembly has a single valve member and accommodates four product inlet lines for selectively passing chemical concentrate to two eductors. The selector valve assembly is composed of a minimum of ports, thereby reducing maintenance and cost.

11 Claims, 5 Drawing Sheets

Related U.S. Application Data continuation of application No. 13/482,062, filed on May 29, 2012, now Pat. No. 8,636,031, which is a continuation of application No. 12/063,333, filed as application No. PCT/US2006/030399 on Aug. 3, 2006, now Pat. No. 8,186,383.

(60) Provisional application No. 60/707,399, filed on Aug. 11, 2005.

(51) Int. Cl.
*B01F 5/04* (2006.01)
*F16K 11/085* (2006.01)
*F16K 11/20* (2006.01)

(52) U.S. Cl.
CPC .......... *F16K 11/0856* (2013.01); *F16K 11/20* (2013.01); *B01F 2215/004* (2013.01); *Y10T 137/0318* (2015.04); *Y10T 137/7837* (2015.04); *Y10T 137/7904* (2015.04); *Y10T 137/8259* (2015.04); *Y10T 137/86863* (2015.04); *Y10T 137/86871* (2015.04); *Y10T 137/87249* (2015.04)

(56) References Cited

U.S. PATENT DOCUMENTS

| | | |
|---|---|---|
| 3,618,637 A | 11/1971 | Santomieri |
| 3,651,991 A | 3/1972 | Ohlson et al. |
| D235,388 S | 6/1975 | Taylor |
| 3,976,227 A | 8/1976 | Ray |
| 4,356,937 A | 11/1982 | Simon et al. |
| 5,033,649 A | 7/1991 | Copeland et al. |
| 5,129,434 A | 7/1992 | Whigham et al. |
| 5,159,958 A | 11/1992 | Sand |
| 5,253,677 A | 10/1993 | Sand |
| 5,259,557 A | 11/1993 | Spriggs et al. |
| 5,344,074 A | 9/1994 | Spriggs et al. |
| 5,351,875 A | 10/1994 | Rhine et al. |
| 5,377,718 A | 1/1995 | Sand |
| 5,400,839 A | 3/1995 | Cravett |
| 5,452,825 A | 9/1995 | Comstock et al. |
| D367,659 S | 3/1996 | Baker et al. |
| 5,522,419 A | 6/1996 | Sand |
| 5,570,816 A | 11/1996 | LaBarbera, Jr. |
| 5,584,327 A | 12/1996 | Thomas et al. |
| 5,653,261 A | 8/1997 | Dalhart et al. |
| D385,746 S | 11/1997 | Fritz |
| 5,799,831 A | 9/1998 | Spriggs et al. |
| 5,832,972 A | 11/1998 | Thomas et al. |
| 5,862,829 A | 1/1999 | Sand |
| D407,092 S | 3/1999 | Weaver |
| D408,207 S | 4/1999 | Bourke |
| 5,902,041 A | 5/1999 | Parsons et al. |
| 5,927,338 A | 7/1999 | Boticki et al. |
| 5,957,152 A | 9/1999 | Dalhart |
| 6,095,372 A | 8/2000 | Dorsey et al. |
| 6,238,081 B1 | 5/2001 | Sand |
| 6,279,598 B1 | 8/2001 | Boticki et al. |
| 6,299,035 B1 | 10/2001 | Dalhart |
| 6,322,242 B1 | 11/2001 | Lang et al. |
| 6,363,977 B1 | 4/2002 | Smeller et al. |
| 6,412,527 B1 | 7/2002 | Brice |
| 6,439,272 B1 | 8/2002 | Wertheim |
| 6,499,872 B2 | 12/2002 | Sand |
| 6,532,998 B2 | 3/2003 | Beldham et al. |
| 6,588,466 B1 | 7/2003 | Lohr |
| 6,619,318 B2 | 9/2003 | Dalhart et al. |
| 6,634,376 B2 | 10/2003 | Haas |
| 6,655,401 B2 | 12/2003 | Sand et al. |
| 6,763,860 B2 | 7/2004 | Jungmann et al. |
| 6,789,708 B2 | 9/2004 | Hansen |
| D498,637 S | 11/2004 | Heilstedt et al. |
| D499,599 S | 12/2004 | Morrison |
| 7,004,355 B1 | 2/2006 | Crisp, III et al. |
| D523,878 S | 6/2006 | Quinlan et al. |
| D544,287 S | 6/2007 | Joss et al. |
| D555,287 S | 11/2007 | Long et al. |
| D555,413 S | 11/2007 | Lin |
| D555,415 S | 11/2007 | Lin |
| 7,331,488 B2 | 2/2008 | Naslund et al. |
| D571,598 S | 6/2008 | Moore |
| D589,738 S | 4/2009 | Michler |
| D589,988 S | 4/2009 | Martin et al. |
| 7,516,763 B2 | 4/2009 | Bertucci et al. |
| D608,129 S | 1/2010 | Spear et al. |
| D619,151 S | 7/2010 | Tsuji |
| D620,302 S | 7/2010 | Picozza et al. |
| 7,963,304 B2 | 6/2011 | Bertucci et al. |
| D652,674 S | 2/2012 | Bertucci et al. |
| 8,186,383 B2 | 5/2012 | Schiller et al. |
| D666,868 S | 9/2012 | Bertucci et al. |
| 8,584,716 B2 | 11/2013 | Bertucci et al. |
| 8,636,031 B2 | 1/2014 | Schiller et al. |
| 2001/0042759 A1 | 11/2001 | Dion |
| 2003/0056841 A1 | 3/2003 | Dalhart et al. |
| 2004/0065673 A1 | 4/2004 | Hansen |
| 2004/0094226 A1 | 5/2004 | Wertheim |
| 2004/0163720 A1 | 8/2004 | Joung |
| 2005/0150572 A1 | 7/2005 | Beldham et al. |
| 2006/0048820 A1 | 3/2006 | Horner et al. |
| 2006/0174778 A1 | 8/2006 | Greiwe |
| 2006/0174779 A1 | 8/2006 | Ng |
| 2007/0028980 A1 | 2/2007 | Lohr et al. |
| 2010/0024915 A1 | 2/2010 | Thomas et al. |
| 2010/0276452 A1 | 11/2010 | Vesborg et al. |

FOREIGN PATENT DOCUMENTS

| | | |
|---|---|---|
| CA | 2618642 | 2/2007 |
| CN | 101326390 | 12/2008 |
| DE | 19736982 | 8/1998 |
| EP | 0068906 | 1/1983 |
| EP | 1945978 | 10/2009 |
| FR | 2130157 | 11/1972 |
| JP | 63210485 | 9/1988 |
| JP | 2002/332670 | 11/2002 |
| JP | 2003/027541 | 1/2003 |
| JP | 2004/509020 | 3/2004 |
| JP | 2004/156387 | 6/2004 |
| JP | 2008/526084 | 7/2008 |
| KR | 10-2008-7005786 | 5/2008 |
| WO | WO 9114647 | 10/1991 |
| WO | WO 0222444 | 3/2002 |
| WO | WO 0240178 | 5/2002 |
| WO | WO 02070397 | 9/2002 |
| WO | WO 2004/031634 | 4/2004 |
| WO | PCT/US2006/030399 | 8/2006 |
| WO | WO 2007/021561 | 2/2007 |

OTHER PUBLICATIONS

Johnson Wax, "Innovative Dilution Control Systems" brochure (2000) showing the Select Dispensing Unit and the Quattro Solutions Center, 9 pages.

TWO EDUCTOR / FOUR-WAY SELECTOR VALVE ASSEMBLY

CROSS-REFERENCE TO RELATED APPLICATION

This application is a continuation of U.S. patent application Ser. No. 14/166,544, filed Jan. 28, 2014, which is a continuation of U.S. patent application Ser. No. 13/482,062, filed May 29, 2012, which is a continuation of U.S. Pat. No. 8,186,383, filed Oct. 15, 2008, which is a U.S. national phase Application filing of International Patent Application No PCT US/2006/030399, Filed Aug. 3, 2006, which claims the benefit of U.S. Provisional patent Application No 60/707,399, filed Aug. 11, 2005, the entire contents of each of which are incorporated herein by reference.

BACKGROUND OF THE INVENTION

Technical Field

This invention relates to a selector valve assembly. More particularly, it relates to a selector valve assembly which can regulate the flow of at least four different fluid materials in conjunction with a dispensing eductor.

Background Art

The use of selector valves in conjunction with eductors for mixing chemical concentrates into a stream of liquid to provide a diluted solution is well-known. For example, see U.S. Pat. Nos. 5,377,718 and 5,653,261.

While these selector valves can control and select four different chemical concentrates to be introduced into an eductor, there is a problem with residual carry-over over when selecting from one chemical concentrate for another. This is caused by the use of the channeled disks 11 in the '718 and '261 patents.

All current selector valve systems which utilize two separate eductors to provide a high and low flow rate use two separate selector valves for each eductor. Not only does this add cost and complexity to the system, it makes the system easier for the end user to mishandle. They can have the selector valve pointed to one product of one eductor and accidentally fill a different product from the second eductor. These types of systems also require labeling of the dispenser for product identification which can also cause misuse.

There is a need for a selector valve which can be used in conjunction with an eductor mixing system which, can reduce the incidence of product carry-over when a selector valve is moved from one position to another. There is also a need for a selector valve which can reduce costs and mishandling.

The objects of the invention therefore are:
a.) Providing an improved selector valve.
b.) Providing an improved selector valve for use with a liquid mixing and dispensing apparatus.
c.) Providing a selector valve of the foregoing type for use with an eductor.
d.) Providing a single selector valve of the foregoing type which can accommodate two different eductors.
e.) Providing a selector valve of the foregoing type which reduces the incidence of product carry-over.
f.) Providing a selector valve of the foregoing type which employs a minimum number of parts and reduces incidence of improper dispensing.
g.) Providing a combined selector valve and eductor assembly.

These and still other objects and advantages of the invention will be apparent from the description which follows. In the detailed description below, a preferred embodiment of the invention will be described in reference to the full scope of the invention. Rather, the invention may be employed in other embodiments.

SUMMARY OF THE INVENTION

The foregoing objects are accomplished and the shortcomings of the prior art are accomplished by the selector valve assembly of this invention which can control the flow of at least two flow paths of fluid. The selector valve assembly has a body member having a compartment with an end wall. There is an outlet passage in the end wall of the compartment and at least two passages communicate with the compartment. A rotatable member is sealably positioned in the compartment, the rotatable member having a side wall and an end wall. A first passageway extends a distance into the rotatable member from the end wall thereof. A second passageway extends through the side wall thereof and communicates with the first passageway. Rotation of the rotatable member will selectively orientate the second passageway with each of the at least two passages so as to cause liquid in the at least two passages to pass to the first and second passageways and subsequently to the outlet passage.

In a preferred embodiment, the selector valve assembly includes four passage ports connected to the body member and communicating with the second passageway in the rotatable member.

In one aspect, the selector valve assembly includes swivel ports connected to the body member and communicating with the four passages in the body member.

In another preferred embodiment, an indexing member is connected to the rotatable member.

In another aspect, the selector valve assembly includes a spring member in biasing contact with the indexing member and a spring retaining member connected to the body member and the spring member.

In yet another aspect, the selector valve assembly includes color indicator means operatively associated with each of the swivel port members.

In yet another preferred embodiment, there are two eductors connected to the outlet passage of the body member.

In still another preferred embodiment, two eductors are connected to the outlet passage of the body member by check valves.

DESCRIPTION OF THE PREFERRED EMBODIMENTS

Figure 1:
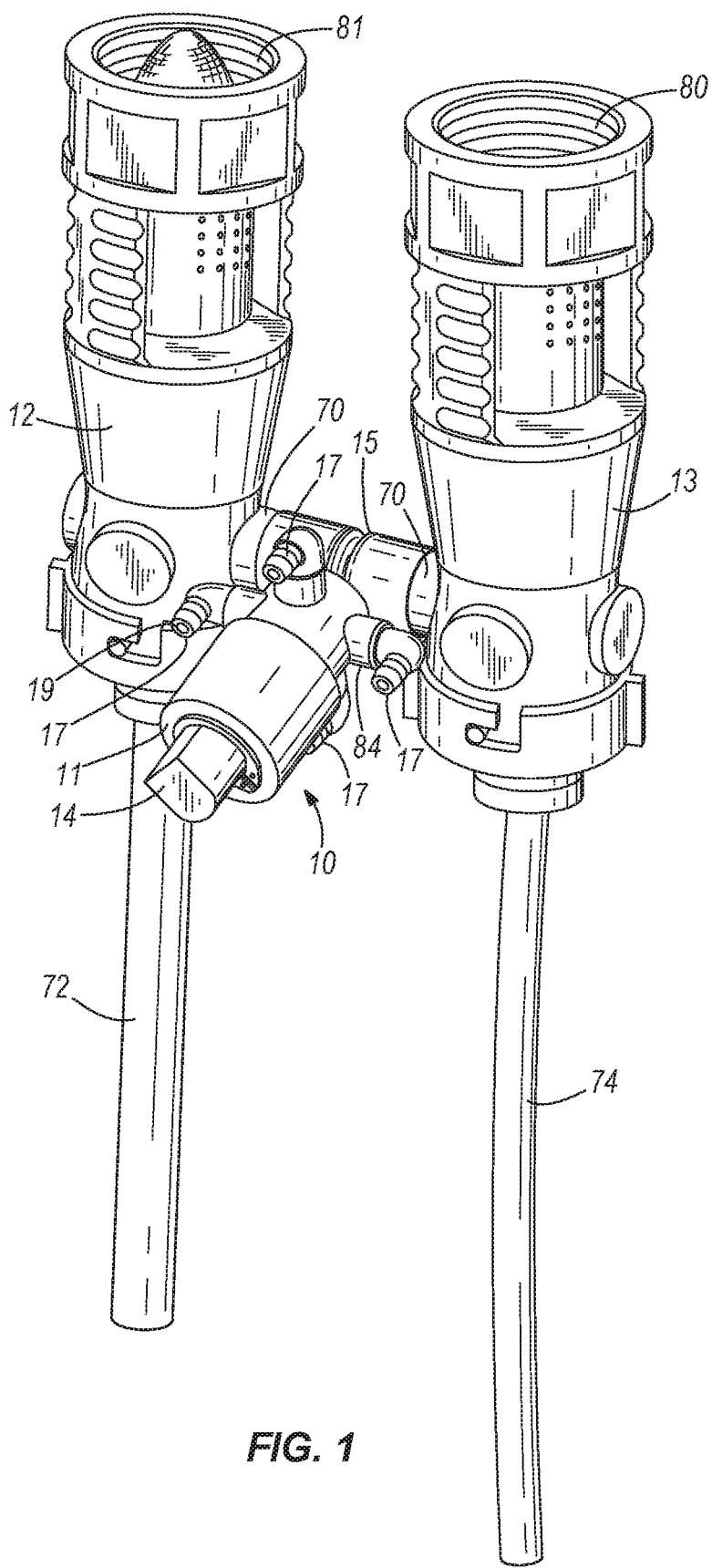
FIG. 1 is a perspective view showing the selector valve assembly connected to two eductors.

Referring to FIG. 1, the selector valve assembly generally 10 is shown in conjunction with two eductors 12 and 13. The preferred eductors are described in commonly owned patent application Ser. No. 11/195,052 filed Aug. 2, 2005 which teachings are incorporated herein. The selector valve assembly 10 includes a valve member 11 with a valve stem 14 housed in a tabular body member 15 to which is connected in a fluid tight manner four fluid intake ports 17, each having nipples 19.

Figure 2:
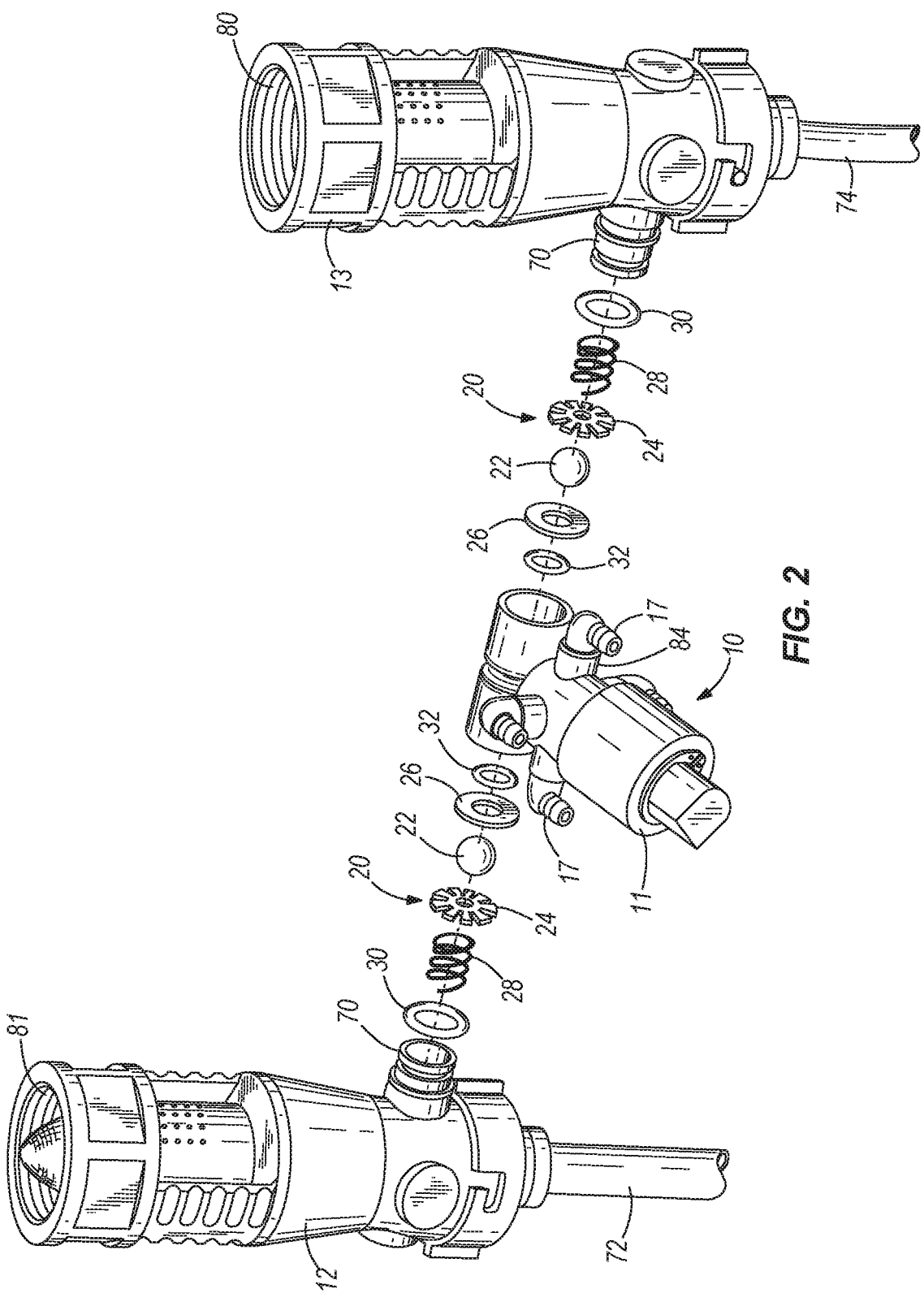
FIG. 2 is an exploded view showing the component parts of the valve for interconnection to the eductors.

As seen in FIG. 2, the selector valve assembly 10 includes two check valve mechanisms generally 20 disposed between the valve member 11 and the eductors 12 and 13. The check valves 20 include check halls 22 and 23. A ball seating washer 26 and check ball guide 24 are also provided as well as a spring 28. Sealing rings are also shown at 30 and 32.

Figure 3:
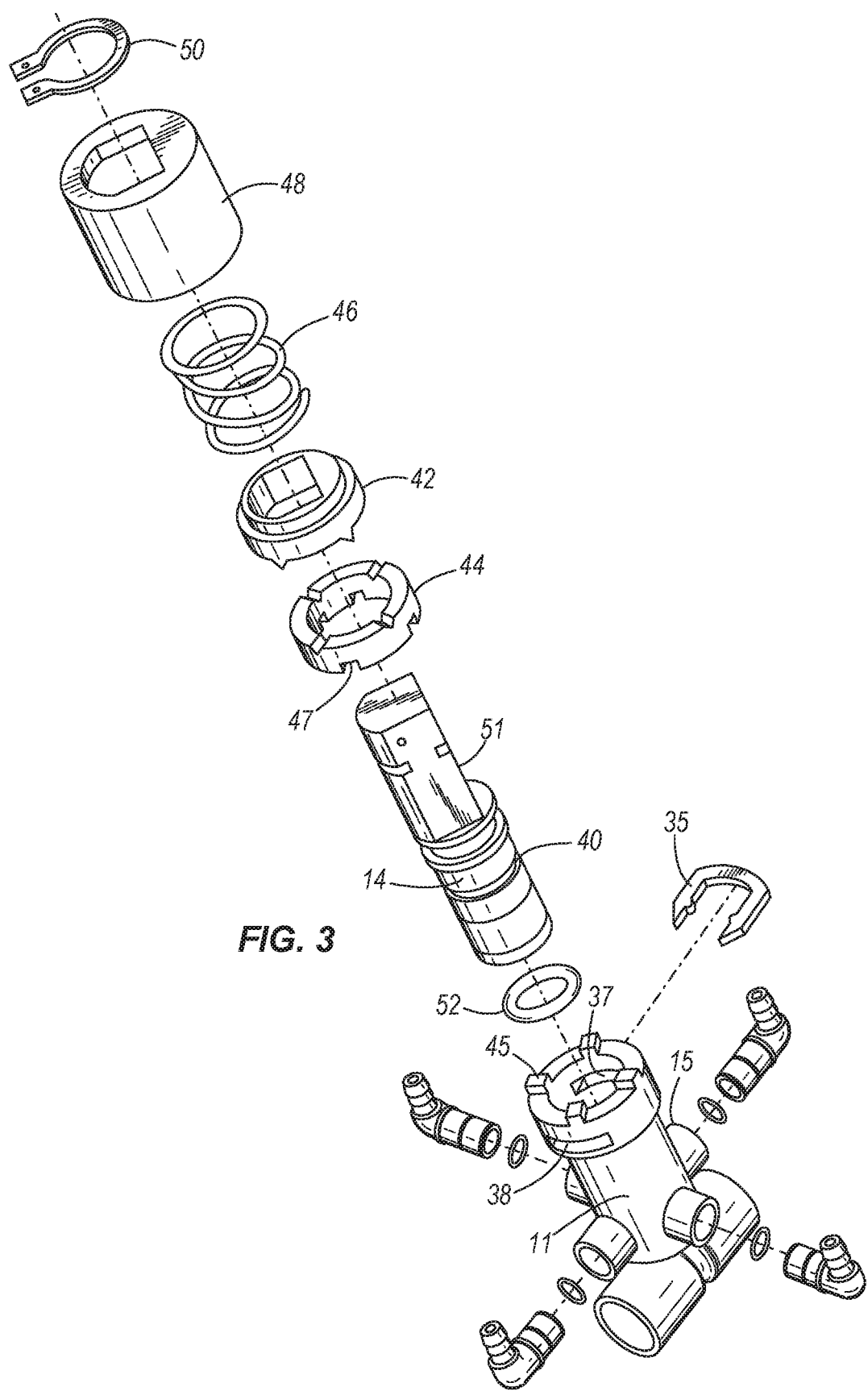
FIG. 3 is another exploded view showing the component parts for placement inside the valve body.
Figure 4:
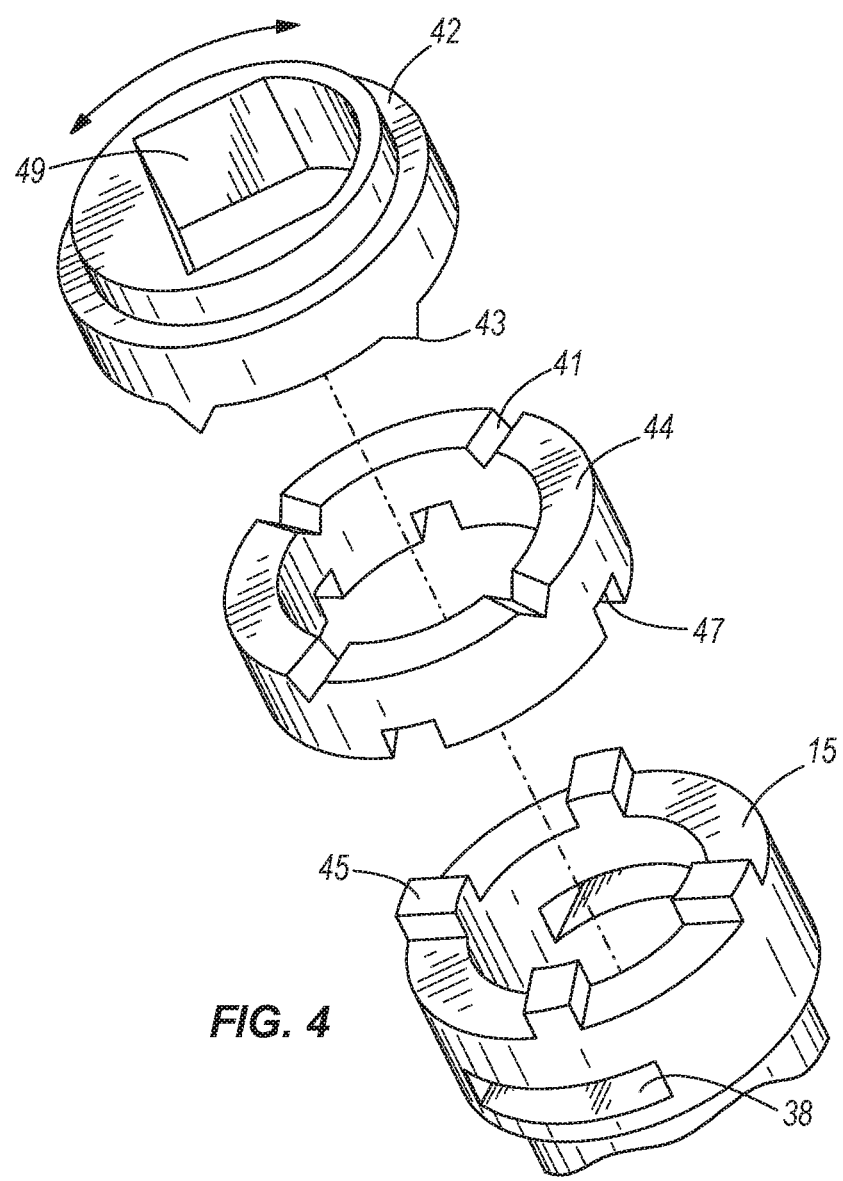
FIG. 4 is still another exploded view showing the valve selector indexing mechanism.
Figure 5:
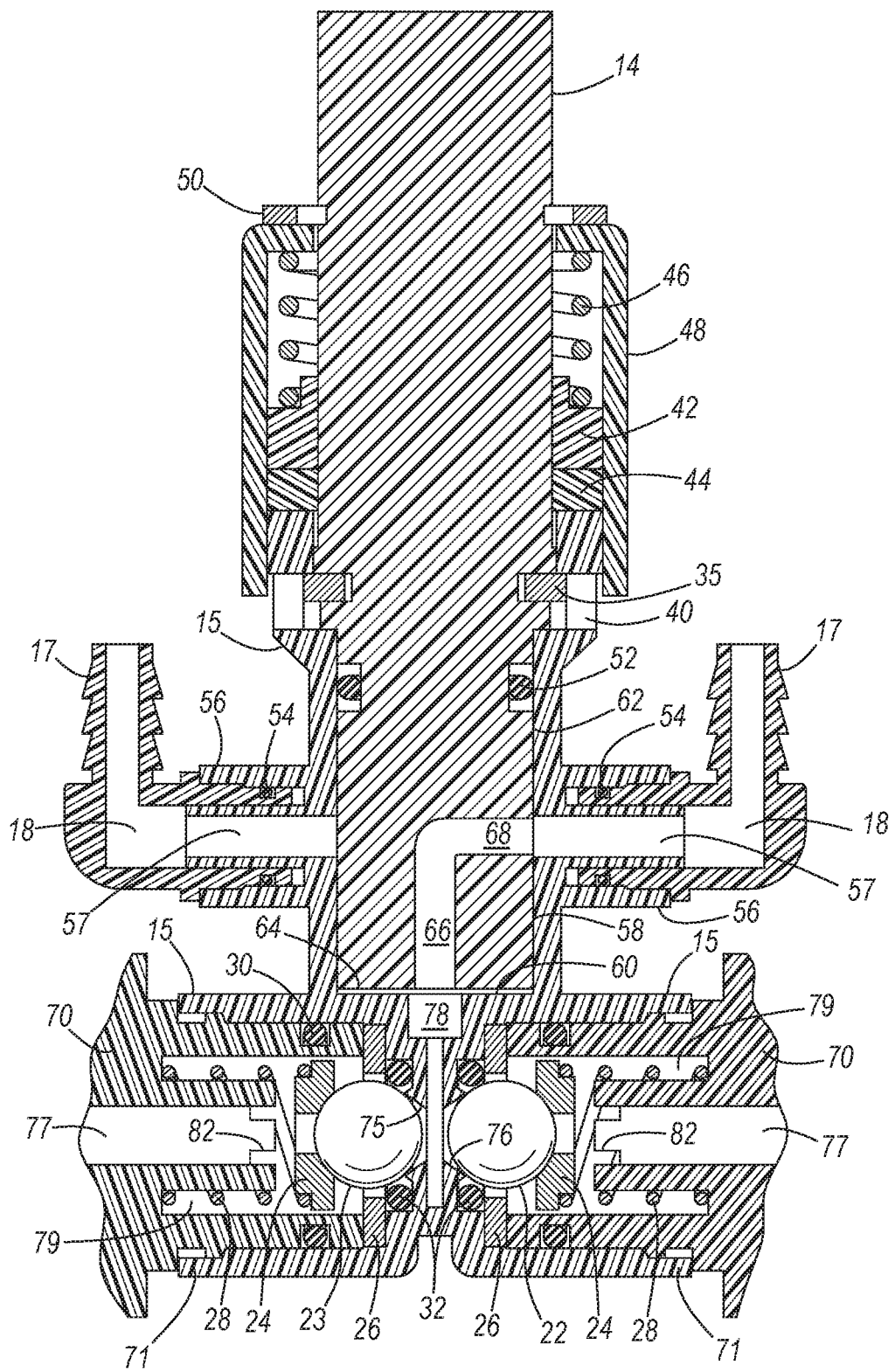
FIG. 5 is a sectional view illustrating one position of the valve.

Referring to FIGS. 3 and 5, valve member 11 is composed of valve stem retainer 35 which fits through slots 37 and 38 in body member 15 and over groove 40 in valve stem 14 to removably retain valve stem 14 in body member 15. An indexing function is provided for the valve stem 14 by means of the indexing plate 42 and indexing receiver 44. Spring 46 biases plate 42 against receiver 44. Indexing receiver 44 is retained on valve stem 14 in a non-rotatable manner by the projections 45 in the body member 15 engaging the cut outs 47 in indexing receiver 44. This is best seen in FIG. 4 where it is also shown the projections 43 on indexing plate 42 for riding over indexing receiver 44 and engaging the indents 41. Indexing plate 42 rotates with valve stem, 14 by means of the flat walls, one of which is shown at 49 and the flat side 51 of valve stem 14.

As best seen in FIG. 5, valve body member 15 has a compartment 58 in which valve stem 14 is seated. A seal ring is provided at 52. It also has an end wall 60. A side wall 62 is provided in valve stem 14 as well as an end wall 64. A passageway 66 extends inwardly into valve stem 14 from the end wall thereof and joins passageway 68 which extends inwardly into valve stem 14 from side wall 62.

As also seen in FIG. 5, passages 18 are provided in intake ports 17 and passages 57 are provided in port housings 56 to provide fluid communication with compartment 58 as well as passageway 68 in valve stem 14. Seal rings are shown at 54. It will also be seen in FIG. 5 that body member 15 has eductor ports 71 which connect with eductor ports 70 of eductors 12 and 13. Eductor ports 70 accommodate springs 28 in compartments 79 as well as check ball guides 24. Passages 77 are disposed in eductor ports 70 and communicate with compartment 79. Compartment 79 also accommodates check balls 22 and 23 as they are seated against valve seats 75 and 76 in body member 15. A passage 78 is located in body member and communicates with passageway 66 in valve stem 14 as well as valve seats 75 and 76.

Operation

A better understanding of the selector valve assembly 10 will be had by a description of its operation. Referring to FIGS. 1 and 5, suitable sources of chemical concentrate are connected, to intake ports 17 and nipples 19 such as with flexible tubing (not shows). It should be understood that eductor 12 has a faster flow rate than eductor 13. Eductor 12 and hose 72 are employed to fill a bucket whereas eductor 13 and hose 74 are employed to fill a bottle. When it is desired to fill a bottle, pressurized water is introduced into the Met 80 of eductor 13. This causes a siphoning effect on check ball 22 by means of passage 77 to move it away from the valve seat 76 to afford fluid communication with passage 78 and in turn passageways 66 and 68. This provides a siphoning effect in intake port 17 to draw chemical concentrate into passage 18, passageways 68, 66, passage 78, compartment 79, past intake portion 82 and into passage 77, in that order. It is ultimately introduced into the wafer stream in eductor 13 in a well-known manner.

When it is desired to fill a bucket, pressurized water is introduced into the inlet 81 of eductor 12. This causes a reduction in pressure on check ball 23 by means of passage 77 to move it away from valve seat 75 to produce a siphoning effect in passages 78 and passageways 66 and 68 as previously explained in conjunction with eductor 13. This draws chemical concentrate into the eductor 12 and hose 72 as also previously explained. It should be noted that when a siphoning effect is produced on one of the check balls 22 or 23, the other one is seated against its respective valve seal by means of spring 28 and the reduced pressure which moves open the other check ball.

When it is desired to introduce a different chemical concentrate m to the eductors 12 and 13, valve stem 14 is rotated so that passageway 68 is orientated with a different intake port 17. Rotation is facilitated by the indexing plate 42 which is spring loaded against indexing receiver 44 by means of spring 46 held captive in spring retainer 48 by clip 50 secured to valve stem 14. Indexing between indexing plate 42 and indexing receiver 44 is accomplished in a well-known manner. This feature affords a positive locating of the valve stem 14 as well as an audible indicator.

In order to assure that the proper chemical concentrates are connected to the proper intake ports 17, colored bands of different colors can be connected to intake ports such as shown at 84 in FIG. 1.

An important feature of the selector valve assembly 10 are the passageways 66 and 68 in the valve stem 14. These afford less carry-over from one chemical concentrate to the other as passageway 68 is moved from one intake port 17 to another. The reason for this is the cylindrical configuration of valve stem 14 acts as a seamless, continuous chemical pathway for either eductor 12 and 13. The passageways 66 and 68 are preferably of 0.104 inch diameter which affords flow of maximum amount of concentrate with minimum amount of product, carry-over. The combined volume of passages 66, 68 and compartments 79 and eductor passages 77 is 0.635 ml. Also the common channel 78 between the check balls 22, 23 and valve seats 76, 75 respectively, is separated by less than 0.100". Tins combined with the size of the compartments 79 for the check valves 20 and the size of eductor passages 77 minimizes retention of chemical concentrate.

Another important feature is serviceability. In order to service the revolving valve stem 14 or valve cylinder all that is required is to remove clips 50 and 35. The stem 14 can be pulled straight out without, removing the selector valve assembly 10 from the eductors 12 and 13 or removing the eductors 80 and 81 and valve assembly 10 from the water valves of a manifold. The spring retaining sleeve 48 connected to the valve stem 14 or handle prevents the clip 35 from backing out of position during use.

The valve assembly 10 allows for a single valve member for use with two eductors. This is a cost savings. It also provides for non unit labeling, where the product is it's own label and the selector valve points toward the intended product. This also allows for a single circuit if an electronic circuit is added for remote monitoring of chemical usage or electronic indicators (flashing lights, LED's, etc.) to further reinforce proper product selection.

The preferred material for manufacturing the selector valve stem 14 is Teflon®. The body member 15 is preferably manufactured from polypropylene. However, other moldable plastic materials could be employed such as a polypropylene copolymer.

The detent on indexing plate 42 affords a stop and audible indicator for the position of the selector valve assembly 10. If desired, it could be eliminated as could the color bands 84. While the selector valve assembly 10 has been illustrated with four intake ports 17 for chemical concentrates, the selector valve can operate with fewer intake ports such as two, or a greater number such as eight. All such modifications within the spirit of the invention are meant to be within a scope as defined by the appended claims.

What is claimed is:

1. A selector valve assembly comprising:
    a valve including a product passageway;
    a plurality of inlets, at least two of the plurality of inlets circumferentially arranged on the valve and disposed on a radial exterior of the valve, and the plurality of inlets configured to be fluidly coupled to different sources of chemical concentrate; and
    one of two outlet passages in fluid communication with the product passageway;
    wherein rotation of the valve is configured to fluidly align the product passageway with a selected inlet of the plurality of inlets to direct chemical concentrate from one of the sources of chemical concentrate through one of the two outlet passages.

2. The selector valve assembly of claim 1, further comprising an eductor fluidly coupled to an outlet of the valve and configured to be in fluid communication with only one of the two outlet passages.

3. The selector valve assembly of claim 2, further comprising a knob coupled to the valve to control movement of the valve.

4. The selector valve assembly of claim 1, further comprising a first eductor configured to fluidly couple to one of the two outlet passages, and a second eductor configured to fluidly couple to the other of the two outlet passages.

5. The selector valve assembly of claim 4, wherein the product passageway is in fluid communication with each of the two outlet passages.

6. A method of controlling flow of fluid through a selector valve assembly, the method comprising:
    rotating a valve to a first position to establish fluid communication between a product passageway of the valve and a first chemical concentrate through a first inlet of the valve;
    rotating the valve to a second position to establish fluid communication between the product passageway and a second chemical concentrate through a second inlet of the valve, the first inlet and the second inlet circumferentially arranged on the valve and disposed on a radial exterior of the valve, the product passageway selectively in communication with the first inlet and the second inlet, and the valve further including an outlet in fluid communication with the product passageway; and
    establishing fluid communication between the outlet and one of two outlet passages,
    wherein, in response to rotation of the valve to the first position, the product passageway is in communication with the first inlet and directs the first chemical concentrate through the outlet, and
    wherein, in response to rotation of the valve to the second position, the product passageway is in communication with the second inlet and directs the second chemical concentrate through the outlet.

7. The method of claim 6, further comprising selectively directing the first chemical concentrate and the second chemical concentrate through an eductor fluidly coupled to the outlet.

8. The method of claim 7, further comprising manipulating a knob coupled to the valve to control movement of the valve between the first position and the second position.

9. The method of claim 6, further comprising establishing communication between the outlet and an eductor in each of the first position and the second position.

10. The method of claim 6, further comprising establishing fluid communication between the outlet and one of two eductors in each of the first position and the second position, wherein one of the two eductors is configured to fluidly couple to one of two outlet passages and the other of the two eductors is configured to fluidly couple to the other of the two outlet passages.

11. The method of claim 6, further comprising selectively directing the first chemical concentrate and the second chemical concentrate through a first eductor or a second eductor both fluidly coupled to the outlet.

* * * * *